(12) United States Patent
Biswas et al.

(10) Patent No.: US 6,535,487 B1
(45) Date of Patent: Mar. 18, 2003

(54) CONNECTION SPLITTING: AN EFFICIENT WAY OF REDUCING CALL BLOCKING IN ATM

(75) Inventors: Subir K. Biswas, Plainsboro, NJ (US); Rauf Izmailov, Middletown, NJ (US); Bhaskar Sengupta, Cranbury, NJ (US)

(73) Assignee: NEC USA, Inc., Princeton, NJ (US)

( * ) Notice: Subject to any disclaimer, the term of this patent is extended or adjusted under 35 U.S.C. 154(b) by 0 days.

(21) Appl. No.: 09/098,347

(22) Filed: Jun. 17, 1998

Related U.S. Application Data
(60) Provisional application No. 60/074,543, filed on Feb. 12, 1998.

(51) Int. Cl.[7] .......................... H04L 1/14; H04L 12/28; H04L 12/56
(52) U.S. Cl. .................. 370/236.1; 370/400; 370/395.1
(58) Field of Search .............................. 370/389, 400, 370/401, 402, 403, 351, 352, 353, 354, 355, 356, 395.1, 395.41, 236.1

(56) References Cited

U.S. PATENT DOCUMENTS

| | | | | |
|---|---|---|---|---|
| 5,343,468 A | * | 8/1994 | Rau | 370/60 |
| 5,546,379 A | * | 8/1996 | Thaweethai et al. | 370/24 |
| 5,784,358 A | * | 7/1998 | Smith et al. | 370/230 |
| 5,898,669 A | * | 4/1999 | Shimony et al. | 370/232 |
| 5,917,828 A | * | 6/1999 | Thompson | 370/474 |
| 6,111,881 A | * | 8/2000 | Soncodi | 370/395 |
| 6,304,549 B1 | * | 10/2001 | Srinivasan | 370/230 |
| 6,381,216 B1 | * | 4/2002 | Prasad | 370/236.1 |

FOREIGN PATENT DOCUMENTS

| | | |
|---|---|---|
| JP | 10-500271 | 1/1998 |
| WO | WO 96/17489 | 6/1996 |

OTHER PUBLICATIONS

Cho, An Efficient Multicast Algorithm for ABR Service in ATM Networks, 1997, IEEE, p. 351–360.*
Boudec et al., Connectionless data service in an ATM–based customer premises network, Jul. 1994, Computer Networks and ISDN Systems, p. 1409–1423.*
Boudec et al., Connectionless data service in an ATM–based customer premises network, Ju.. 1994, Computer Networks and ISDN Systems, p. 1409–1423.*
A. Iwata, et al., "PNNI Routing Algorithms for Multimedia ATM Internet," NEC Research & Development, vol. 38, No. 1, Jan. 1997, pp. 60–73.

(List continued on next page.)

Primary Examiner—Seema S. Rao
Assistant Examiner—Ronald Abelson
(74) Attorney, Agent, or Firm—Sughrue Mion, PLLC

(57) ABSTRACT

A technique for reducing ATM call blocking is provided that splits wideband connections into multiple low-bandwidth sub-connections and routing them independently through the network. Fragmented network bandwidth is used for supporting calls which are otherwise blocked by conventional routing. A detailed cell-level design for the split scheduling algorithms is provided. A system for implementing splitting without requiring any protocol changes within the network is provided. Such a system modifies the control plane protocols only within the end-stations.

6 Claims, 15 Drawing Sheets

OTHER PUBLICATIONS

A. Iwata, et al., "ATM Routing Algorithms with Multiple QOS Requirements for Multimedia Internetworking," IEICE Trans. Commun., Vo. #79–B, No., 8, Aug. 1996, pp. 999–1007.

F. Bonomi, et al., "The Rate–Based Flow Control Framework for the Available Bit Rate ATM Service," IEEE Network, Mar./Apr. 1995, pp. 25–39.

J. Duncanson, "Inverse Multiplexing," IEEE Communications Magazine, Apr. 1994, pp. 34–41.

P. Fredette, "The Past, Present, and Future of Inverse Multiplexing," IEEE Communications Magazine, Apr. 1994, pp. 42–46.

S. Vinoski, "CORBA: Integrating Diverse Applications Within Distributed Heterogeneous Environments," IEEE Communications Magazine, Feb. 1997, pp. 46–55.

J.E. van der Merwe, et al., "Switchlets and Dynamic Virtual ATM Networks," IFIP 1996, pp. 1–14.

* cited by examiner conn. 2 (.5)
conn. 1 (1)

conn. 2 (.5)
conn. 1 (.5)
conn. 1 (.5)
conn. 3 (.5)

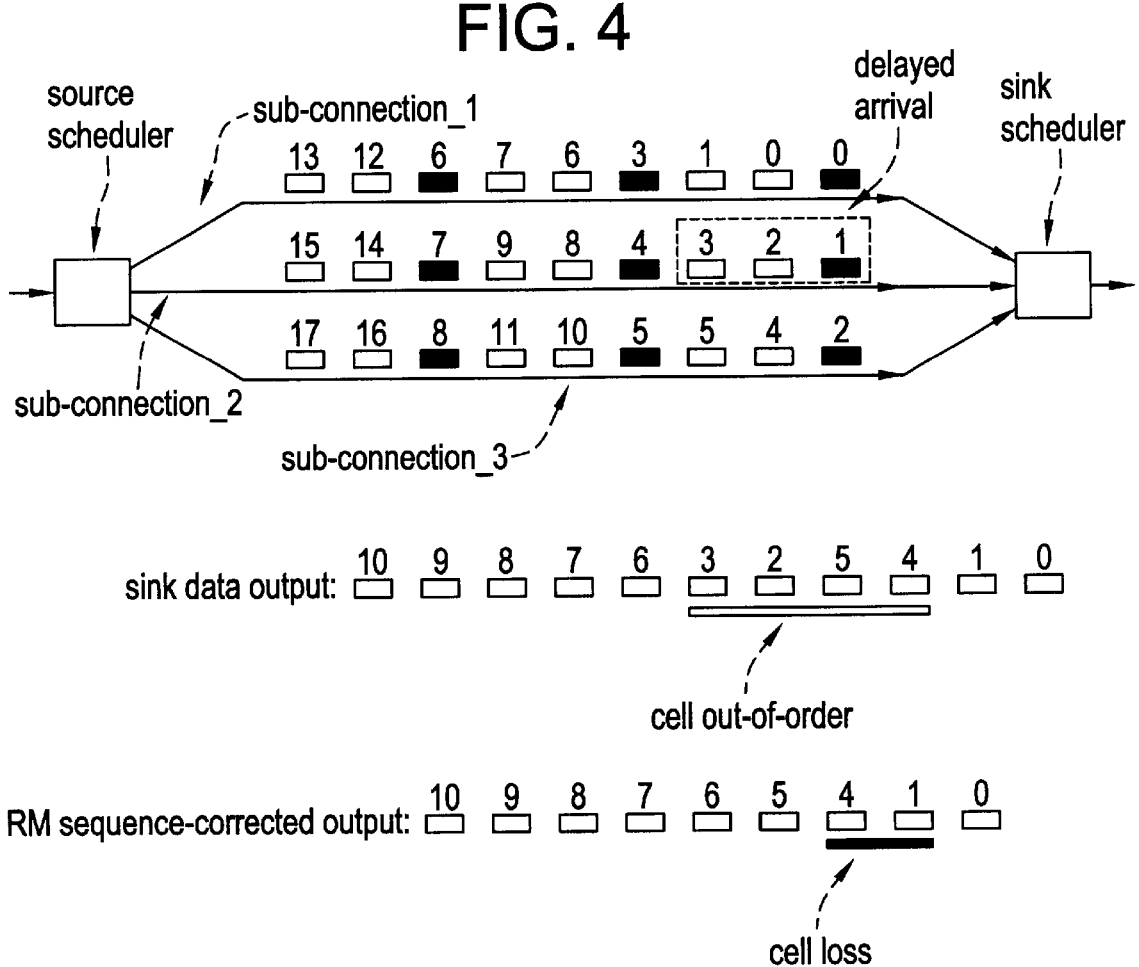

CONNECTION SPLITTING: AN EFFICIENT WAY OF REDUCING CALL BLOCKING IN ATM

I. DESCRIPTION OF THE INVENTION

This application claims priority from co-pending U.S. Provisional Patent Application No. 60/074,543 filed on Feb. 12, 1998, provisional application expired.

IA. FIELD OF THE INVENTION

This invention relates to splitting an ATM connection into multiple sub-connections so that call blocking is reduced and a network is better utilized. Specifically, this invention relates to a system and method for splitting a network ATM connection and sending a message through these sub-connections. This invention is embodied in a network system using connection splitting and in methods for splitting an incoming ATM cell flow before being sent through sub-connections.

IB. BACKGROUND

Contemporary networking services can be categorized into two functionally orthogonal technologies, namely, connection-less and connection-oriented protocols. In the connection-less category, Internet Protocol (IP) continues to dominate the current market. The primary advantages of IP are its low initial latency for data transfer and its potential for fine-grain network load balancing which is achieved through packet level routing.

On the other hand, connection-oriented protocols like ATM perform call level routing which offers a natural way of reserving network resources for end-applications. However, ATM has lesser control on bandwidth fragmentation which is caused by its call level routing.

Bandwidth fragmentation occurs when a connection occupies a part of a link bandwidth leaving the rest of the bandwidth unused. Such an unused bandwidth becomes fragmented when it is not enough for a new connection. Therefore, it is desirable to have an ATM network with a more balanced load and improved blocking performance, while maintaining its inherent resource reservation and Quality of Service (QoS) features.

Connection splitting according to the present invention shares some common ideas with the technique of Inverse Multiplexing, used in the Public Switched Digital networks (PSDN). Inverse Multiplexing (IM) is a mechanism for combining multiple switched digital channels to create a single high bandwidth end-to-end connection. See J. Duncanson, "Inverse Multiplexing", *IEEE Communications Magazine*, April 1994, pp. 34–41. Both for ATM splitting and IM, multiple sub-connections have to be setup before the protocol operations start. Additionally, in case of IM multiple phone numbers have to be dialed. A splitting mechanism at the source and a joining mechanism at the destination are also necessary in both the approaches. Despite these functional similarities, the implementation approaches are significantly different. In case of Inverse Multiplexing, framing bits are used for inter-channel synchronization which is an essential information for frame ordering at the destination. In addition, the standard "Aggregation of Multiple Independent 56 kbit/s or 64 kbits/s channels into a Synchronized Wideband Connection", for IM also allows to put numbered frames of 256 octets, which makes cell ordering relatively more straightforward. See ANSI Draft from TIA Committee TR41.4, pp. 3014.

At least the following problems exist in conventional ATM networks:
- Unused bandwidth leaves the network bandwidth fragmented
- Fragmented bandwidth leads to wastage of precious network resources

II. SUMMARY OF THE INVENTION

It is an objective of this invention to solve the above-mentioned problems in conventional ATM networks in an efficient manner. Specifically, it is an objective of this invention to allow an ATM network to use connection splitting to reduce call blocking and provide less bandwidth fragmentation.

Since conventional ATM does not provide any mechanism for cell sequencing, it is an objective of the present invention to design a set of split and join scheduling protocols to handle out-of-order delivery of cells caused by splitting. The reasons for such out-of-order delivery include cell loss and varying cell transfer delay through different sub-connections. It is found that if cells are lost it is not possible to avoid the out-of-order delivery completely. Therefore, a specific objective of this invention is to design the split and join scheduling algorithms carefully so as to maintain the probability of cells being delivered out-of-order within an acceptable range.

Another important objective of the present invention is to keep the users, as well as the network, insulated from the effects of connection splitting. Such user transparency is required to keep the splitting scheme compatible with the existing applications. Network transparency also allows existing switching equipments to handle splitting without any hardware and software modifications. It also makes the scheme architecturally open and, therefore, allows easy deployment of traffic control mechanisms like ABR flow control over split connections.

In order to achieve the above objectives the present invention provides a technique for splitting a single ATM connection into multiple sub-connections and then to route each of the sub-connections independently. Further, the ATM cell-flow at the source is partitioned and sent through the sub-connections. Then, at the destination, all the sub-flows are joined again to reconstruct the original cell flow.

In the present invention, all the splitting related data-plane functions are encapsulated at the ATM Adaptation Layer (AAL) of the source and the destination. Also, the signaling enhancements are implemented as a separate layer which works on top of the regular ATM signaling stack. And these enhancements are required only at the end-stations.

The present invention potentially enhances capacity utilization by improving network load balancing. As a result, for a given network the present invention facilitates more user traffic and reduces call blocking experienced by high-bandwidth connections. The requirements for such a performance are that the sub-connections must comply with the required QoS of the application, and their aggregated User Parameter Control (UPC) profile should match with the original traffic parameters.

The present invention also uses a new type of ATM resource management (ATM RM) cell for cell sequencing. The ATM RM cell is an important component of this invention that makes the implementation of ATM connection splitting significantly different from the conventional Inverse Multiplexing technique.

Specifically in order to accomplish the objectives of this invention, a method of splitting an ATM connection is provided between a source and a destination into a plurality of sub-connections, wherein said messages comprise ATM data cells, said ATM data cells being transmitted using more than one of said plurality of sub-connections, said splitting being done for transmitting messages in an ATM network such that said ATM network has reduced call blocking.

Further improvements include a method wherein Resource Management (ATM RM) cells are added to a flow of the ATM data cells, wherein they are used for an ordered delivery of said ATM data cells.

Another aspect of the present invention is a method of scheduling a source in an ATM network the method comprising selecting a predetermined degree of splitting, a flow distribution, UPC specifications, a value of periodicity $N_{rm}$ of ATM RM cells and a new sub-connection; setting an ATM RM sequence counter to zero; sending an ATM RM cell and increasing the ATM RM sequence counter by one; sending $N_{rm}$ number of ATM data cells through the selected sub-connection; checking flow distribution specification; determining if sub-connection is to be switched; repeating the steps if sub-connection is not to be switched and selecting a new subconnection and repeating the steps if sub-connection is to be switched.

Yet another aspect of the present invention is a method of scheduling a sink in an ATM network, said method comprising selecting a predetermined degree of splitting, flow distribution, selecting UPC specifications, selecting a value of periodicity $N_{rm}$ of ATM RM cells; queuing the ATM data cells for each sub-connection in a corresponding sink buffer; setting the value of a variable Expected ATM RM (ERM) to zero; scanning all the sink buffers and selecting a buffer with the smallest numbered ATM RM cell in front of it; dropping all ATM data cells until the next ATM RM cell if the ATM RM cell selected is less than the value of the variable ERM; clocking available ATM data cells in the sink buffer if the ATM RM cell selected in is not less than the value of the variable ERM; updating the value of the variable ERM to one more than the sequence number of the ATM RM cell selected; delivering the available ATM data cells; repeating for all the sink buffers.

Further improvements include the previous method wherein ATM data cells are clocked only if there are $N_{rm}$ or less cells within two surviving ATM RM cells in a sink buffer, otherwise they are dropped.

Still further improvements include the previous method wherein said sink scheduling is initiated only after all sink buffers are filled with at least two ATM RM cells.

An improvement includes a method wherein $N_{rm}$ is chosen based on an application's burst tolerance. Further improvement has an $N_{rm}$ of at least 32.

An improvement includes a splitting method wherein a PNNI protocol is used to setup split sub-connections for transferring messages. Still further improvements include a splitting method wherein the sub-connections are setup prior to routing using PNNI. In another improvement the sub-connections are setup after routing using PNNI.

Another aspect of this invention includes a method of transferring a message using PNNI protocol, said method comprising: splitting an arrived call into a predetermined number of sub-calls if the call requires a bandwidth higher than a predetermined threshold; making a PNNI routing decision for each of said sub-calls; making a PNNI routing decision for the original call if the message is not split; blocking the call if the calls and the sub-calls that are routed are not acceptable; accepting the call if sub-calls are acceptable.

Another aspect of this invention includes a method of transferring a message using PNNI protocol, said method comprising: making a PNNI routing decision on an arrived call; accepting the call if the call is acceptable; splitting the arrived call into a predetermined number of sub-calls if the call is not acceptable and requires a bandwidth higher than a predetermined threshold; making a PNNI routing decision for each of said sub-calls; blocking the call if the sub-calls that are routed are not acceptable; accepting the call if the sub-calls are acceptable.

Another aspect of this invention is a connection-splitting network system for transferring messages using ATM comprising a source, a sink, a source scheduler; and a sink scheduler, wherein, a connection from said source is split into multiple sub-connections by a splitter signalling module, multiple sub-connections are established between said source and said sink, said messages are segmented into ATM data cells, said ATM data cells are sent to multiple sub-connections by said source scheduler, and the sink scheduler reassembles the message at said sink.

Further improvements include a network system wherein each of said source scheduler and said sink scheduler are placed in a split sub-layer, said split sub-layer being part of a connection splitting ATM Adaptation Layer (AAL) that is placed above a conventional ATM layer, said split sub-layer comprising buffers and said connection splitting AAL comprising a native AAL layer and the split sub-layer.

III. LIST OF FIGURES

The above objectives and advantages of the present invention will become more apparent by describing in detail preferred embodiments thereof with reference to the attached drawings in which:

FIG. 1(a)–(c) shows a network topology, a conventional routing and an example of connection splitting.

FIG. 2 shows an ATM RM cell based scheduling for maintaining cell ordering.

FIG. 3(a)–(c) show the effects of cell loss on sink scheduling ($N_{rm}$ is equal to 2).

FIG. 4 shows the effects of cell delay variation on sequencing ($N_{rm}$ is equal to 2).

FIG. 5(a)–(b) show flowcharts describing source and sink scheduling algorithms.

FIG. 6(a)–(b) show a scheduling cell loss profile.

IV. DETAILED DESCRIPTION

IVA. Splitting Architecture

Splitting of a connection is performed by setting up multiple end-to-end sub-connections and distributing the cell flow of the original connection among these sub-connections. An example of a preferred embodiment depicting the splitting scenario is illustrated in FIGS. 1(a)–(c).

Figure 1A:
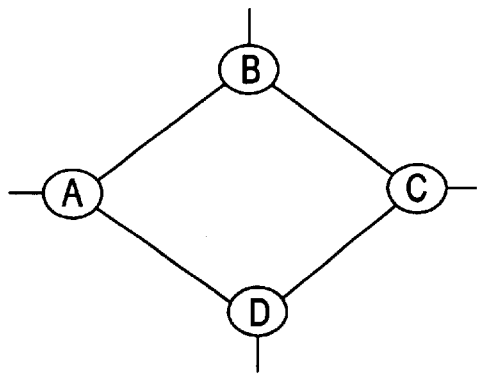
Figure 1B:
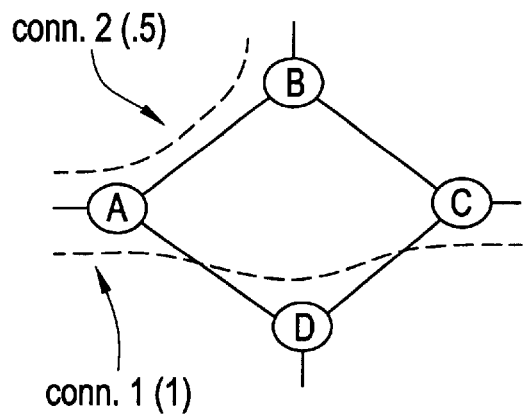

FIG. 1(a) shows the network topology where each link has one unit of bandwidth. Consider a traffic scenario in which there are three connections with the following bandwidth requirements. Connection A→C requires one unit whereas connection A→B and A→D both require 0.5 units of bandwidth. With conventional routing (FIG. 1(b)), the network can support connection A→C and either A→B or A→D but not both. In this case the utilized hop-bandwidth product is 2.5 which is only 62.5% of the total network hop-bandwidth product of 4.

Figure 1C:
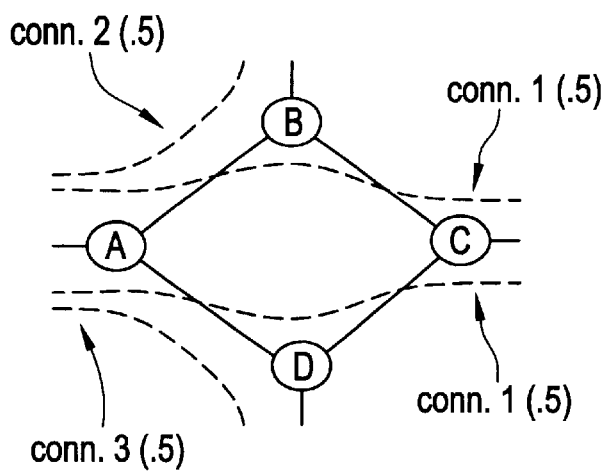

Now consider the connection-splitting scenario in FIG. 1(c) where connection A→C is split into two sub-connections; one routed through node B and the other through node D. Now, both the connections A→B and A→D can be supported simultaneously with the split connection A→C. This raises the utilized hop-bandwidth product to 3.0 which is a 20% improvement over the Conventional routing scenario. This example shows that a careful connection splitting, according to the present invention, was able to reduce call blocking for the given network. The underlying philosophy of such a splitting is to use fragmented network bandwidth which cannot be accessed by connections, setup with conventional routing.

In the present invention the connection is always split and subsequently joined only at the end-stations and never within the network. Each of the sub-connections are also routed independently, enabling the network to use standard routing protocols. Note that although the sub-connections are routed independently it is possible that they may physically share some of the links on their way to the destination.

IVA.1 Cell Sequencing

Connection splitting and subsequent cell scheduling may cause cells in a single ATM connection to follow different routes through different sub-connections. This, in addition to variable path delays of the sub-connections, may give rise to cells being delivered out-of-order.

Two options can be considered for maintaining cell sequence during connection splitting. The first option uses per-cell sequence numbers that form part of the ATM AAL layer protocols. The incoming sub-flows stored in buffers at the destination. Subsequently the sub-flows are scheduled and assembled according to the AAL layer per-cell sequence numbers. However, such an approach has two problems. First, not all the AAL protocols provide per-cell sequence numbers; a notable example being AAL5. Second, even the ones which support sequencing use a very short sequence number field. AAL1, for instance, uses only three bits which is too short to provide a robust sequencing mechanism in the presence of large bursty losses.

To avoid this problem, an aspect of this invention provides a scheduling mechanism which uses a special type of Resource Management (ATM RM) cells. Periodic sequencer ATM RM cells are interspersed within the original cell flow. Such ATM RM cell sequence numbers are used at the destination for ordered delivery of the ATM data cells.

For this purpose, a new type of ATM RM cell is defined that is ignored by the intermediate switches and interpreted only at the end-stations. In subsequent sections detailed description of source and-sink scheduling is provided.

IVA 1.1 Source Scheduling

Figure 2:
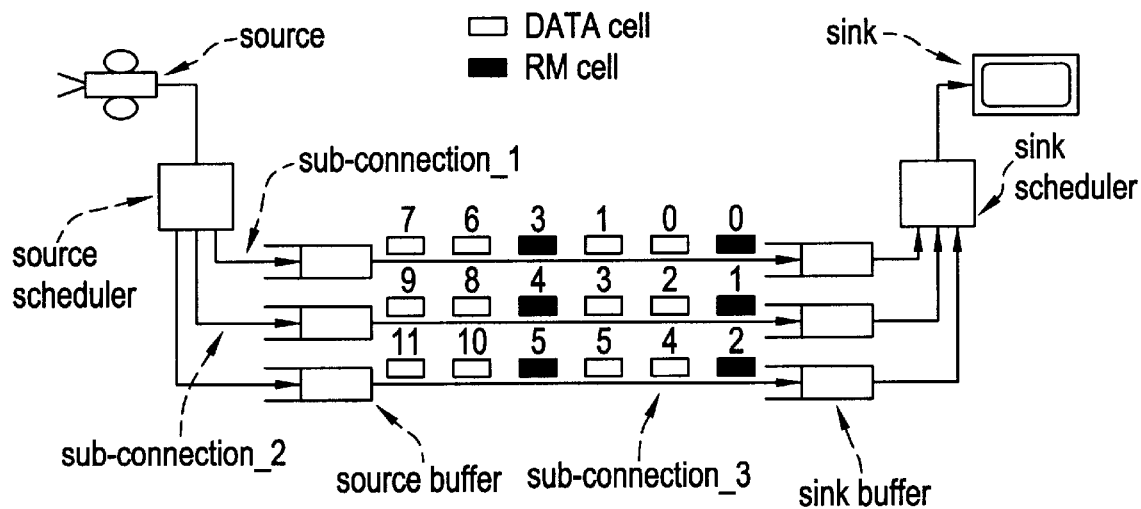

FIG. 2 shows a preferred embodiment of the use of the source scheduling technique in which an ATM RM cell is transmitted after every $N_{rm}$ ATM data cells. The mechanism is illustrated in the scheduling scenario, shown in FIG. 2.

The source scheduler initiates cell dispatching by sending ATM RM cell 0 through sub-connection 1. It then transmits two ATM data cells ($N_{rm}$=2) before switching to sub-connection 2. Now, ATM RM cell 1 is sent through sub-connection 2 followed by two ATM data cells. Similarly transmission is switched to another sub-connection before sending the next ATM RM cell. This process continues and the source scheduler switches among all the available sub-connections.

Although in this preferred embodiment a round-robin scheduling is used, one skilled in the art will understand that this does not restrict the scope of this invention and any scheme can be used. Such a decision is based on the flow partitions among the sub-connections.

IVA.1.2 Sink Scheduling

At the destination, the cells transmitted through all the sub-connections are queued within the corresponding sink buffers. The sink scheduler first scans all the sink buffers and selects the buffer with the smallest numbered ATM RM cell in its front. At this stage, the scheduler also needs to check the ATM RM sequence number. Such a checking is done by maintaining an expected ATM RM sequence (ERM) counter. ERM is always set to one more than the sequence number of the last ATM RM cell handled by the sink scheduler. Whenever an ATM RM cell is identified as the smallest numbered ATM RM cell currently available in all the sink buffers, its number is compared with the ERM. If the ATM RM cell number is smaller than ERM then all the subsequent ATM data cells till the next ATM RM cell are dropped. Otherwise, if the ATM RM cell is not smaller than ERM, the scheduler deletes the ATM RM cell in front of the selected sub-connection buffer and clocks the available ATM data cells out until another ATM RM cell is found. The value of ERM is then updated. It should be noted that in this specification the term "clocking out" is used to refer to the process of removing ATM data cells out of the buffer at a specific cell-rate.

The purpose of maintaining the value of ERM is to ensure that the processed ATM RM sequence number always goes up monotonically. This ensures that ATM data cells are sequenced in the correct order. Note that for a sub-connection, cells are clocked out at a rate decided based on the computed UPC parameters for that particular sub-connection. After removing the ATM data cells from the queue and delivering them, the scheduler goes back to the scanning phase for finding the sub-connection with the smallest numbered ATM RM cell in its sink buffer.

IVA.2 Effects of Cell Loss

The cell ordering mechanism for connection splitting according to an aspect of this invention described earlier works well in an environment where no cells are lost. Another aspect of this invention is an improvement which considerably reduces the impact of cell losses. First the impact of cell loss is discussed followed by a detailed description of the improvements to the connection splitting method which ameliorate the effects of such cell losses.

IVA.2.1 ATM RM Cell Loss

Figure 3A:
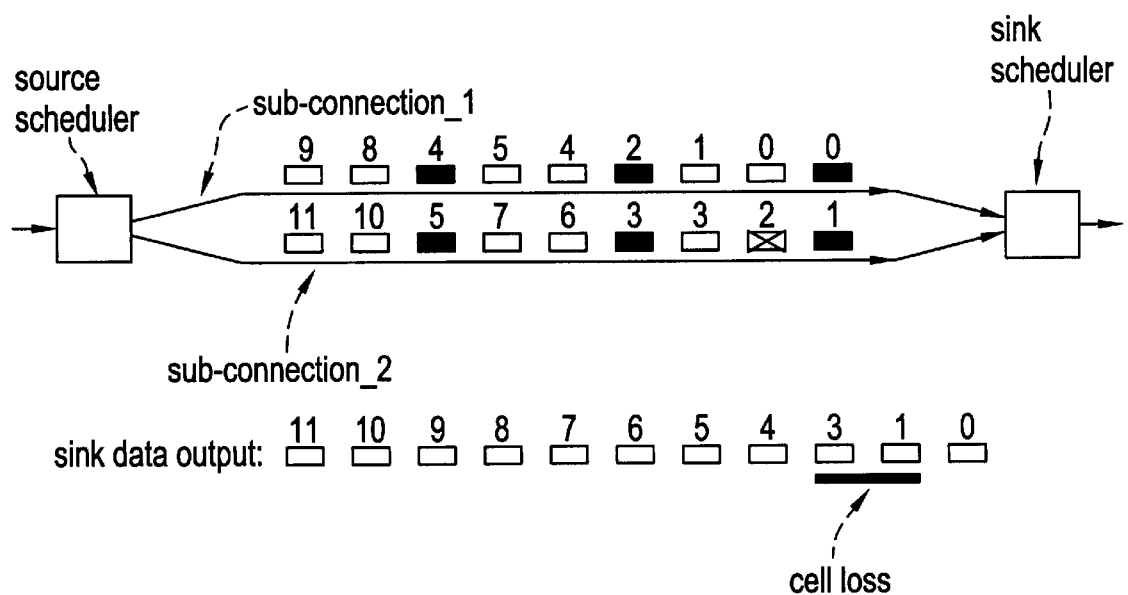
Figure 3B:
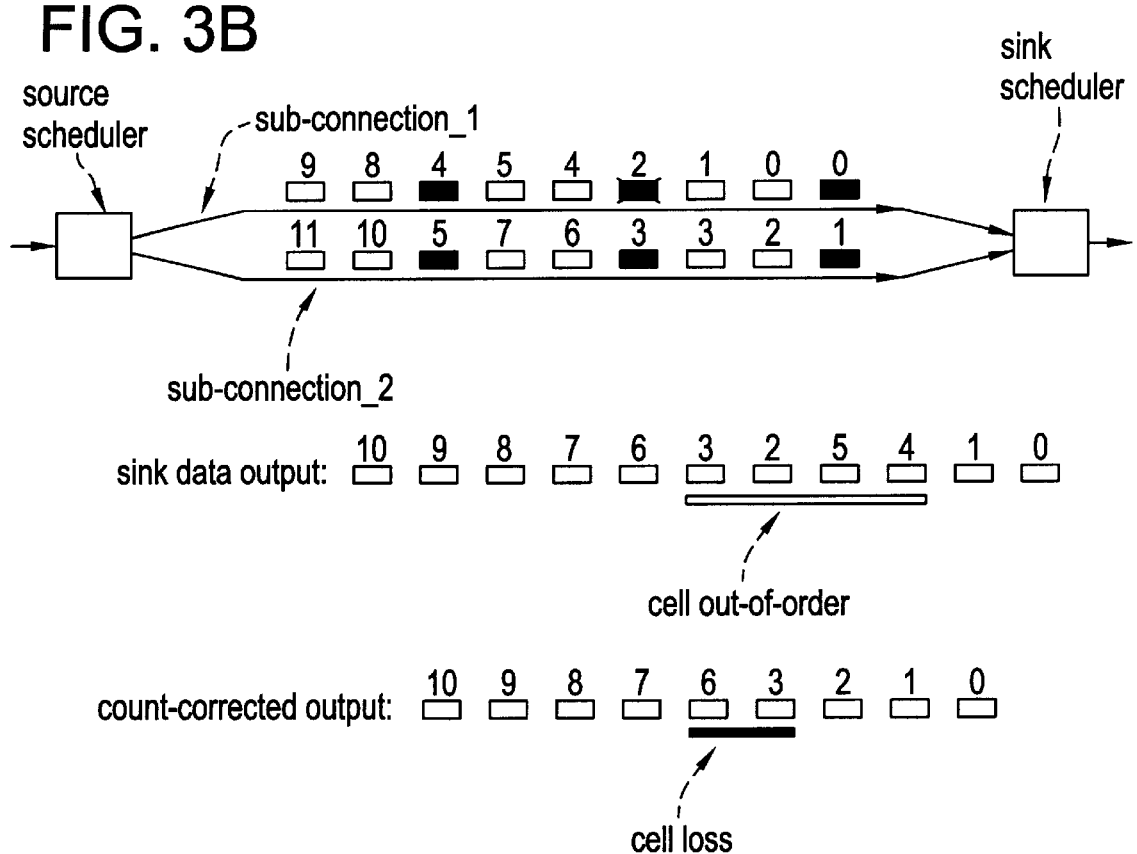

An ATM data cell loss in a sub-connection appears as a regular cell loss in the reconstructed connection and causes no further damage. Such a case is illustrated in FIG. 3(a) where the loss of ATM data cell 2 in sub-connection 2 results in a missing cell in the reconstructed stream. However an ATM RM cell loss, on the other hand, can cause out-of-order delivery, as shown in FIG. 3(b). Because of the missing ATM RM cell 2 in sub-connection 1, the sink scheduler clocks out the cells 0,1, 4 and 5 contiguously. And then it switches to sub-connection 2 for clocking out cells 2 and 3.

Although no ATM data cells are lost, the ATM RM cell loss results in out-of-order delivery for cells 2, 3, 4 and 5.

Such a problem is alleviated in a further aspect of this invention by further enhancements to the sink scheduling algorithm. In this enhancement, the scheduler is prevented from continuously clocking out more than $N_{rm}$ (2 in the present example) ATM data cells before it handles the next ATM RM cell. The effect of this modification is reflected in the stream in FIG. 3(*b*) that shows that the counts are corrected.

Note that the out-of-order problem is avoided at the expense of ATM data cell loss. The rationale behind this is that ATM networks, especially the upper layers including transport protocols, are equipped with the mechanisms to handle cell losses that are inherent to it. On the other hand, ATM data cells normally do not arrive out-of-order. Therefore it is reasonable to avoid cells arriving out-of-order at the cost of additional cell losses, as long as the effective loss rate can be restricted within an acceptable limit.

Now consider an example where ATM RM cell 0 is lost in sub-connection 1. In such a situation, ATM data cells 0 and 1 cannot be utilized since no sequence information for those two cells are available. So the sink scheduler should drop them.

Additionally, the following step is added to the sink scheduling algorithm in order to handle the ATM data cells which appear at the front of a sink-buffer. When the scheduler scans all the sink buffers for finding a sink buffer with the smallest numbered ATM RM cell (see Section IVA.1.2) it also checks if there is any buffer having an ATM data cell at its head. If such a buffer is found then all its ATM data cells from the head on until the first ATM RM cell is deleted. This overcomes the problem of a ATM data cell being at the head of a buffer.

IVA.2.2 ATM data cell and ATM RM Cell Loss

Figure 3C:
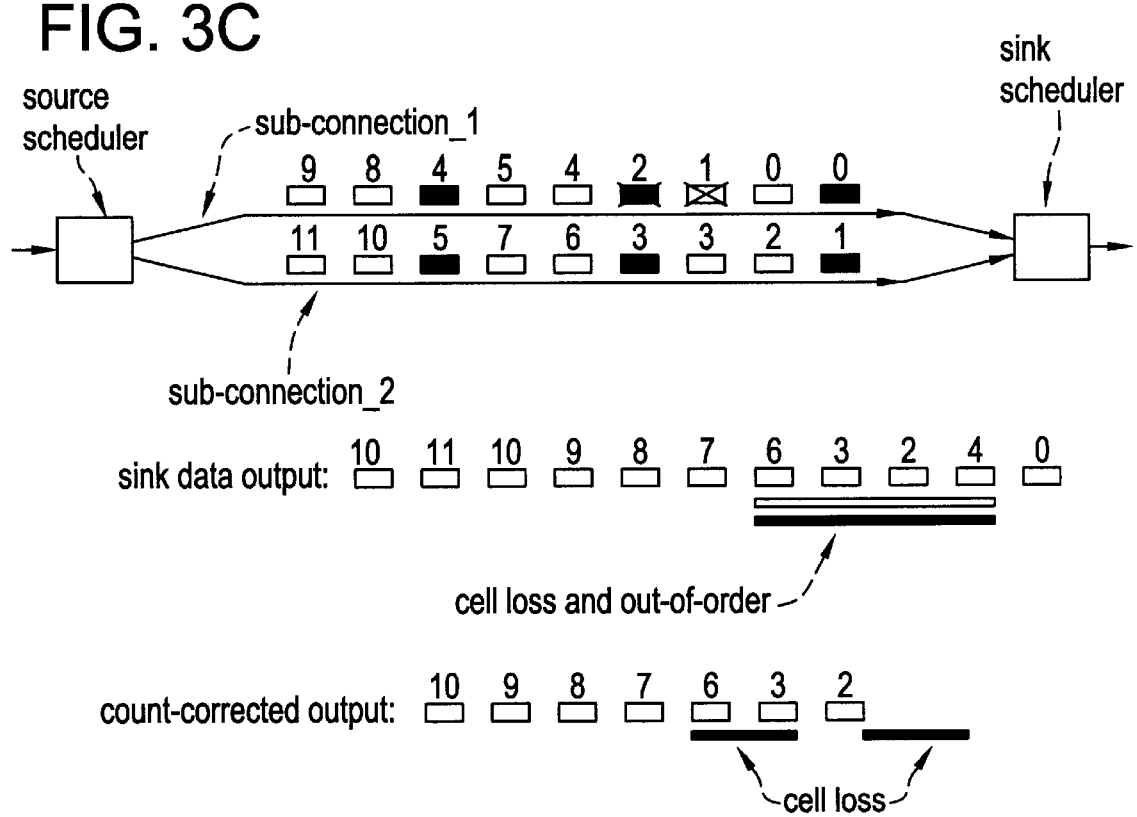

A more complicated situation arises when both ATM and ATM RM cells are lost simultaneously. An example of such a scenario is illustrated in FIG. 3(*c*) where ATM data cell 1 and ATM RM cell 2 are lost in sub-connection 1. After handling ATM RM cell 0 the sink scheduler clocks ATM data cells 0 and 4 out and deletes ATM data cell 5. This is according to the count correction technique mentioned earlier, according to which at most $N_{rm}$ continuous ATM data cell clocking is permitted before the next ATM RM cell is examined. The scheduler next finds ATM RM cell 1 in sub-connection 2 and clocks ATM data cells 2 and 3 out. This results in both cell loss (ATM data cells 1 and 5) and out-of-order delivery.

The present invention avoids this problem by enhancing the count correction process so that ATM data cells are clocked out only if there are $N_{rm}$ or less ATM data cells present within two ATM RM cells in a sink buffer. In addition, if at least two ATM RM cells are not present then clocking out from the buffer will be delayed till two ATM RM cells are available. When two ATM RM cells exist in a buffer and if the number of ATM data cells within the two ATM RM cells is more than $N_{rm}$ then the ATM RM cell in the front and all the ATM data cells between the two ATM RM cells are deleted.

Like in the earlier case, applying this count correction enhancement overcomes the ordering problem but results in larger cell loss rate. Note that there exists another case where, in addition to ATM data cell 1 and ATM RM cell 2, the ATM data cell 4 can also be lost. In such a case even count correction enhancement mechanism fails to fix the ordering problem. In the present example, the resulting stream will look like: . . . , 10, 9, 8, 7, 6, 3, 2, 5, 0. In Section IVA.5 it is shown that by maintaining large values of $N_{rm}$, the probability of such an event occurring can be made extremely small.

IVA.3 Effects of Delay Variation

Variable cell transfer delay through multiple sub-connections can also result in out-of-order cell delivery. Consider the example of FIG. 4 where a bunch of cells containing ATM RM cell 1 and ATM data cells 2 and 3 through sub-connection 2 experience an additional delay compared to the cells through sub-connections 1 and 3. Once the ATM data cells 0 and 1 are clocked out from sub-connection 1 the scheduler finds sub-connection 3 as the one with the smallest numbered ATM RM (which is 2). Therefore, ATM data cells 4 and 5 are clocked out. In the meantime, the delayed cells arrive at the sink buffer of sub-connection 2 and so the sink scheduler clocks ATM data cells 2 and 3, since the newly arrived ATM RM cell 1 turns out to be the current smallest numbered ATM RM cell. This results in cells being delivered out-of-order.

Such a problem is overcome by another aspect of this invention. In this improvement ATM RM sequence checking is implemented at the sink scheduler. It is ensured that the arrived ATM RM sequence number goes up monotonically.

An expected RM sequence (ERM) counter is provided which is always set to one more than the sequence number of the last handled ATM RM cell. Whenever a new ATM RM cell is identified as the current smallest numbered ATM is RM cell available in all the sink buffers, its number is compared with the ERM. If it is smaller than ERM then all the following ATM data cells till the next ATM RM cell are dropped. Otherwise, the ATM data cells are accepted and the ERM value is updated as stated before. A preferred embodiment illustrating this aspect of the invention is shown in FIG. 4 where out-of-order delivery is eliminated by dropping two ATM data cells.

IVA.4 Startup Issues

This section describes another aspect of this invention dealing with the measures to be adopted during the initiation of sink scheduling to further lessen the probability of the scheduling being faulty.

Consider the example shown in FIG. 3(*a*) where the sink scheduler is waiting for cells to arrive through sub-connections 1 and 2. In this example it should be noted that the ATM data cell 2 is not lost. If sub-connection 1 has a longer path delay then it is likely that the first cell that can be scheduled for the sink will be ATM RM cell 1.

Assume that after delivering ATM data cells 2 and 3 the scheduler finds the ATM RM cell 0 in sub-connection 1. In such a case, the scheduler ignores the ATM RM cell in order to maintain the ATM RM sequence checking criterion, explained in Section IVA.3. As a result, ATM data cells 0 and 1 are lost. Because of this initial extra delay in sub-connection 1, the effect of the lost cells may continue till the termination of the connection. As a result, all the data through sub-connection 1 will be dropped by the scheduler even though all the cells through this sub-connection are transmitted properly.

To solve this problem, according to a still further aspect of this invention the initiation of the sink scheduling process is deferred till all the sink buffers are filled with at least two ATM RM cells; that is all the buffers are ready to be checked for the count correction criterion, explained in Section IVA.2.2. The head of a buffer in such a case should contain at least an ATM RM cell followed by ATM data cells and then a second ATM RM cell. This will ensure that the sink buffer for longest delay sub-connection is ready when the sink scheduling starts.

However, the above mentioned enhancement adds a startup scheduling delay of $D_{max}+(N_{rm}+2)/R$ where $D_{max}$ is the maximum of all the sub-connection path delays and R is the effective rate with which cells are sent through the sub-connection that has the longest delay. Once the startup delay is completed, all the sink buffers contain enough cells to feed the scheduler.

Cells flow continuously out of the scheduler after scheduling starts, because of a pipeline effect. The pipeline effect also ensures that the delay experienced by all the cells is equal to the start-up delay of $D_{max}+(N_{rm}+2)/R$.

Figure 5A:
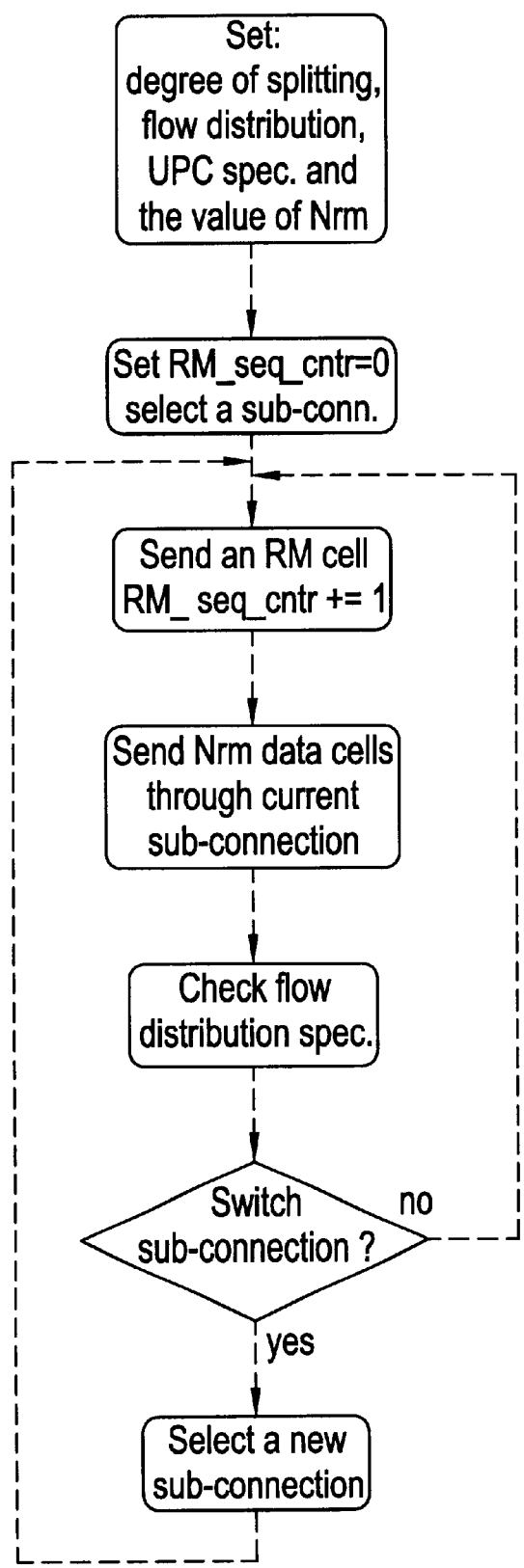
Figure 5B:
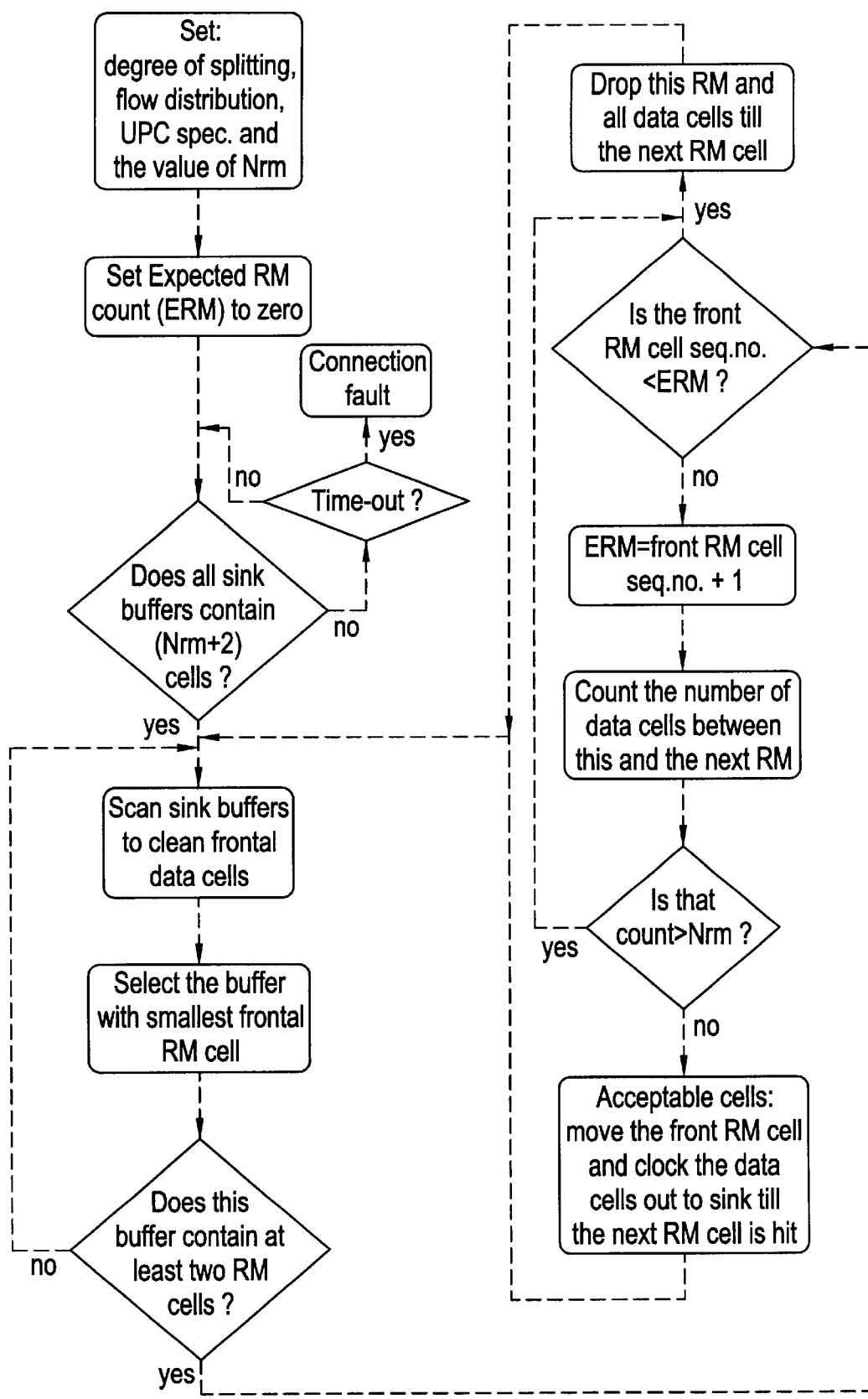

A preferred embodiment with all the enhancements to the source and the sink scheduling algorithms, are shown in the flowcharts in FIGS. 5(a)–(b). These flowcharts are self-explanatory. In order to handle connection faults it is necessary to implement a time-out mechanism for the sink scheduler.

During startup, if the scheduler has to wait for more than a pre-set time period it concludes that at least one of the sub-connections is faulty. In such an event the split connection is declared to be faulty. Also, during scheduling, if a sink buffer does not receive cells for more than a specific period of time the scheduler conclude that the sub-connection is faulty. The scheduler then indicates the signaling layer to terminate the connection. The exact values used for time-out are decided based on, among other factors, the class of traffic and the related UPC parameters.

IVA.5 Scheduling Performance

This section describes factors that have an impact on the selection of $N_{rm}$ to improve scheduling performance.

After sink scheduling cell loss results from the effects of ATM data cell loss and ATM RM cell loss. The effects of an ATM RM cell loss are amplified because a lost ATM RM cell can potentially cause the sink scheduler to drop $N_{rm}$ ATM data cells. The cells are dropped to minimize the chance of out-of-order delivery. The combined cell loss rate can be expressed as $$p(3-3p+p^2),$$

where p represents the line cell loss rate for the subconnections.

This expression is derived herein. As explained in Section IVA.1.2, scheduling cell loss can occur due to both ATM and ATM RM cell losses on the line. Let p be the line cell loss rate. Here it is assumed that the value of p is the same over all the sub-connections and also the probabilities of losses for two consecutive cells in a sub-connection are not correlated to each other. Assume that an ATM RM cell and the following $N_{rm}$ ATM data cells constitute a frame. With respect to a given frame, two status variables RMS and PRMS are defined. RMS represents the reception status of the ATM RM cell of the frame and PRMS indicate the reception status of the ATM RM cell in the previous frame.

For both, reception success and failure are represented by the symbols A and L respectively. For a frame these two variables RMS and PRMS give rise to four different combinations which are summarized in the following table.

| RMS | $P_{RMS}$ | PRMS | $P_{PRMS}$ | $P_{RMS} \cdot P_{PRMS}$ | marginal ATM data |
|---|---|---|---|---|---|
| A | 1 – p | A | 1 – p | $(1-p)^2$ | $pN_{rm}$ |
| L | p | A | 1 – p | $p(1-p)$ | $N_{rm}$ |
| A | 1 – p | L | p | $p(1-p)$ | $N_{rm}$ |
| L | p | L | p | $p^2$ | $N_{rm}$ |

The column for $P_{RMS}$ and $P_{PRMS}$ represent the probabilities of the variables RMS and PRMS having the values A or L. The last column describes the marginal data cell loss caused by the corresponding event. Multiplying the net probabilities ($P_{RMS} \cdot P_{PRMS}$) and marginal losses for each row and adding them together the expression $pN_{rm}(3-3p+p^2)$, which represents the total number of ATM data cell loss in a frame, is obtained. Now dividing it by the frame size $N_{rm}$, the expression for the effective cell loss ratio is found to be:

$$CLR=p(3-3p+p^2)$$

An interesting property of the effective loss probability is that it depends only on the line cell loss rate and not on the number of sub-connections and the RM cell periodicity $N_{rm}$. The sub-connection independence comes from the fact that an ATM RM cell loss in a sub-connection can cause ATM data cell dropping only for that particular sub-connection. As for the $N_{rm}$ dependency, it is true that larger the value of $N_{rm}$ more number of ATM data cells are dropped for a single ATM RM cell loss. But at the same time, lesser number of ATM RM cells are sent through the network when the value of $N_{rm}$ goes up; in other words, at the sink scheduler, lesser number of ATM data cells are dropped because of ATM RM cell loss. These two effects counterbalance each other and keep the overall loss probability insulated from the ATM RM cell periodicity. Such a low cell loss probability is reasonable in network transmission.

Figure 6A:
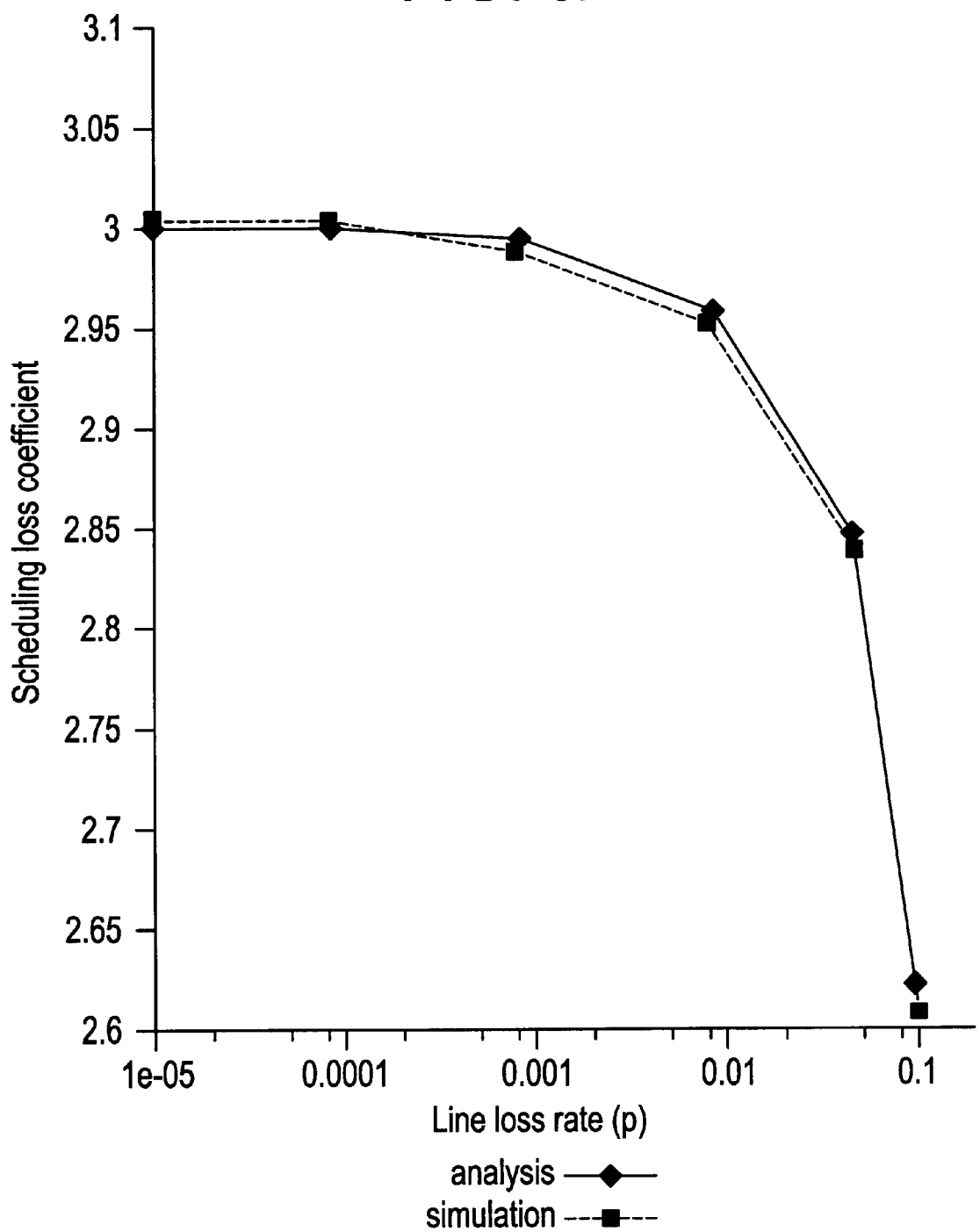

Simulation experiments and analytical results are presented in FIG. 6(a). The scheduling loss coefficient represents the after-scheduling mean loss rate, normalized by the mean line cell loss rate. From the graph, one can observe that the cell loss after split scheduling is always of the same order of magnitude as the original line cell loss rate p. In the worst case, it is only three times the original line cell loss rate and that happens for relatively smaller values (less than approximately $10^{-4}$). It implies that the connection splitting has very little impact on the resulting mean loss rate.

Figure 6B:
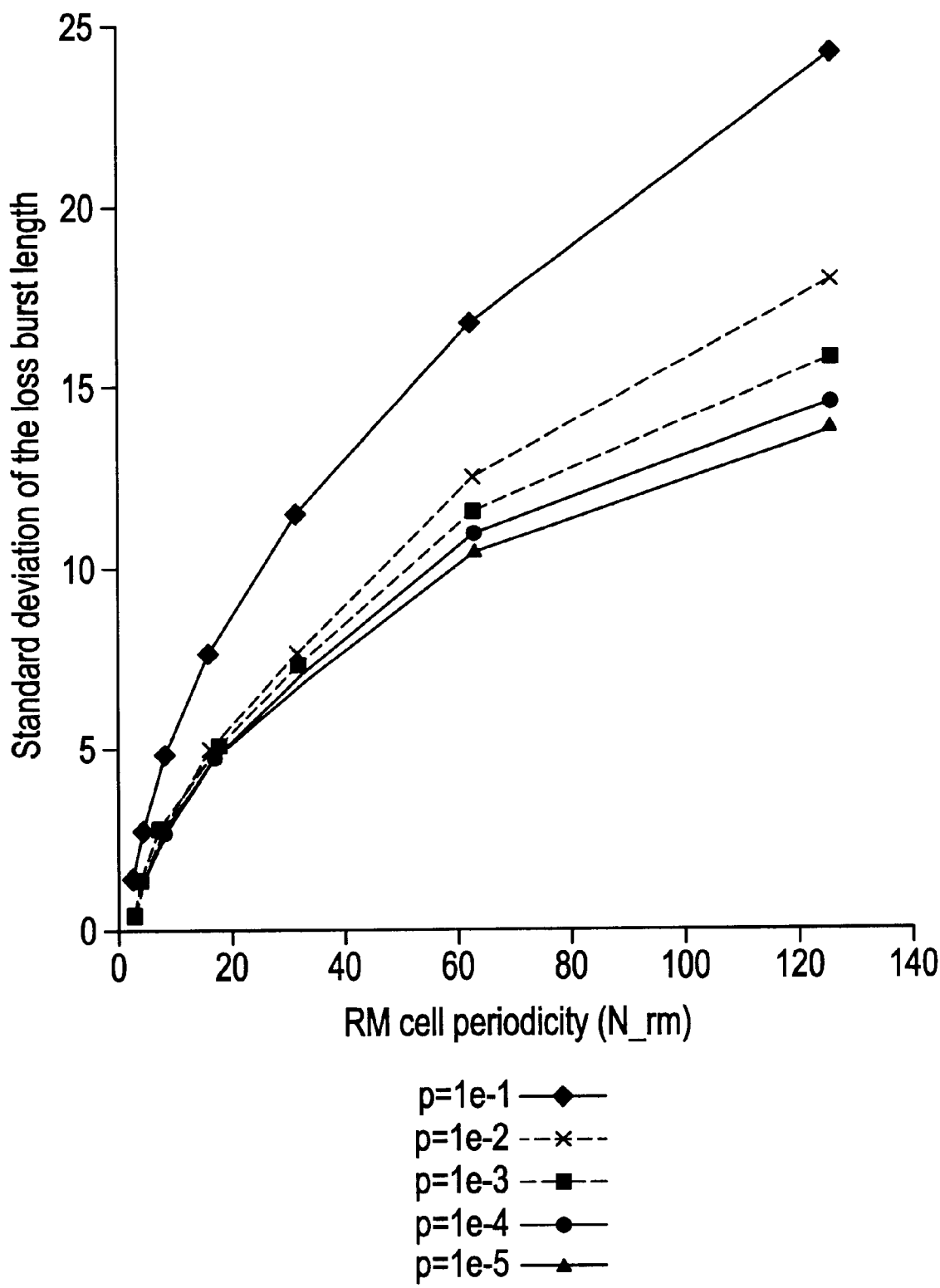

Burstiness of the cell loss is measured using simulation experiments. Loss burst length is defined as the number of cells which are lost contiguously, whenever a cell loss occurs. The standard deviations of such burst lengths with varying ATM RM cell periodicity are plotted in FIG. 6(b). Note that although the average loss does not depend on $N_{rm}$, the burst length depends on $N_{rm}$. This is because larger the value of $N_{rm}$, more number of ATM data cells will be dropped contiguously on a single occurrence of ATM RM cell loss.

For the described scheduling algorithms, cell out-of-order rate (COR) can be expressed as:

$$COR = \sum_{j=2}^{\infty} p^{j-1} \sum_{i=(j-1)N_{rm}}^{jN_{rm}-1} \binom{jN_{rm}}{i} p^i (1-p)^{jN_{rm}-i}.$$

A derivation of this expression is provided herein. A cell out-of-order may occur (see Section IVA.1.2) if, in addition to the loss of an ATM RM cell, more than $N_{rm}-1$ and less than $2N_{rm}$ ATM data cells are lost from two adjacent frames. The probability of losing one ATM RM cell and exactly i ($N_{rm} \le i < 2N_{rm}$) ATM data cells from two adjacent frames is equal to:

$$P_i = p \binom{2N_{rm}}{i} p^i (1-p)^{2N_{rm}-i}.$$

Summing this over the entire range of i the expression for cell out-of-order rate is obtained as:

$$COR = \sum_{i=N_{rm}}^{2N_{rm}-1} P_i.$$

Figure 7:
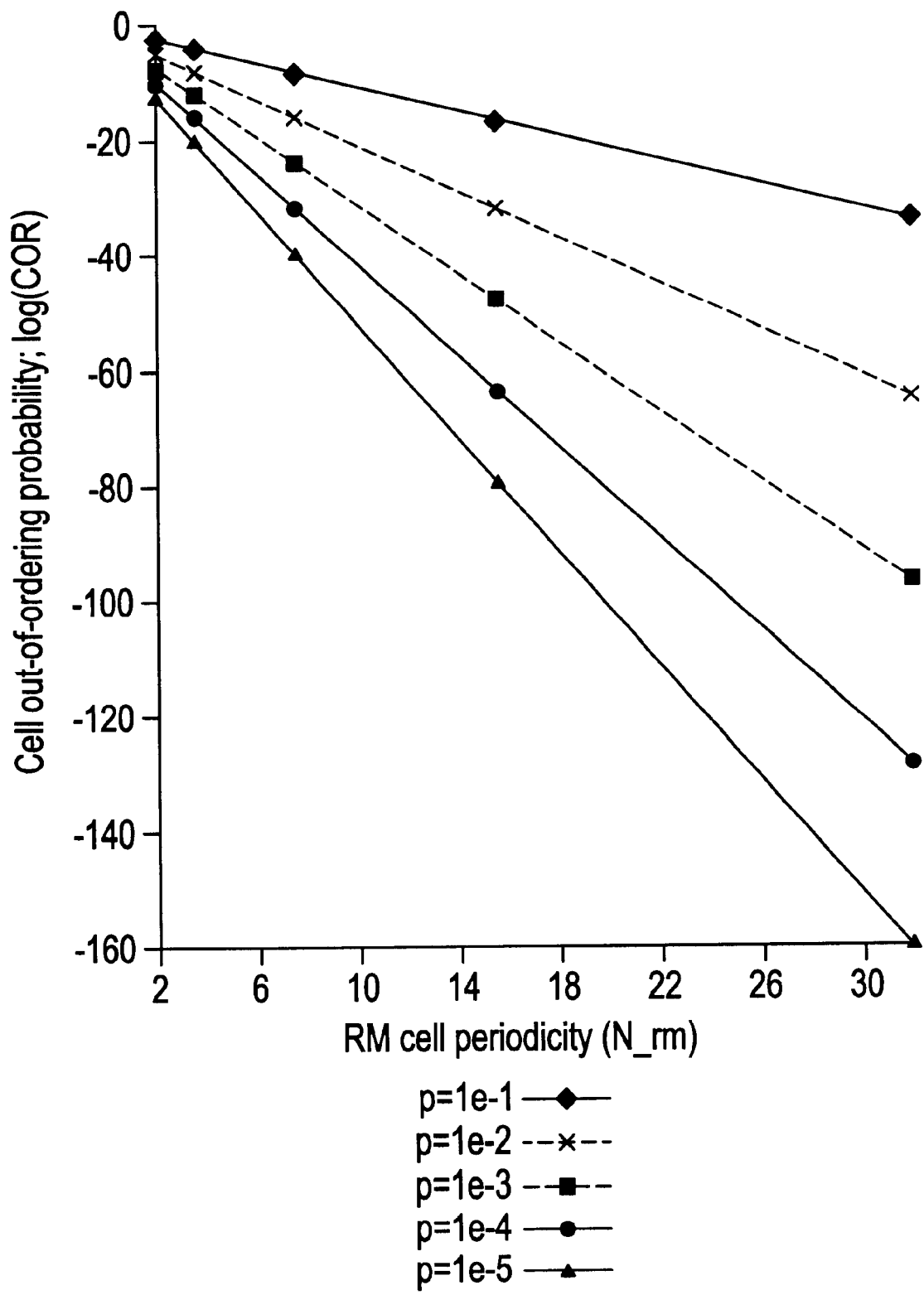
FIG. 7 shows a graph of cell out-of-order rate with varying $N_{rm}$.

While hot being dependent on the number of sub-connections, the COR varies with both p and $N_{rm}$. As shown in FIG. 7, the value of COR exponentially decreases with increasing ATM RM cell periodicity and it reaches to values less than $10^{-30}$ when $N_{rm}$ is chosen as 32. This range of COR values is considered to be acceptable for all practical purposes.

The data presented in FIGS. 6–7 and the above mentioned derivations help in selecting a value of $N_{rm}$ that suits the needs of a specific application.

IVA.5.1 Choice of $N_{rm}$

An important aspect of this invention is the optimal choice of $N_{rm}$. Sending ATM RM cells for cell sequencing incurs a $100/N_{rm}\%$ capacity overhead for a split connection. In addition to the capacity overhead, the value of $N_{rm}$ also influences the cell out-of-order rate (COR) and the burstiness of cell loss.

From FIG. 7, it can be seen that for any $N_{rm}$, greater than 32, the out-of-order rate remains within a comfortable region which is less than $10^{-30}$. In this range of $N_{rm}$ the capacity overhead is less than 3.125%, which can also be considered acceptable. With a typical line cell loss probability of say $10^{-3}$, the standard deviation of loss burst length has a small value of 7 for $N_{rm}=32$ (from FIG. 6). It goes up to 16 when $N_{rm}$ is pushed to 128.

Considering these numbers it can be concluded that around 32 is a reasonable lower-bound for ATM RM cell periodicity and the exact value of it should be chosen based on an application's loss burst tolerance. For a data application running on top of AAL5, loss of a single cell and a burst loss of few cells may have the same effect, that is a single AAL5 block will be dropped because of CRC failure.

It can be said that such applications can tolerate large loss bursts and a large value of $N_{rm}$ should be appropriate for them. Real-time applications like audio, on the other hand, tend to be more vulnerable to large loss bursts. Therefore, a conservative choice of $N_{rm}$ proves to be more reasonable for such connections.

IVC. Network System using Connection Splitting

This section describes a preferred embodiment of a network system using the connection splitting features of the present invention. An important issue in such a system is to decide on the placement of the splitting related functions in the network. Although hop-by-hop splitting is a possibility, it will require all or at least some of the existing ATM switches to recognize the splitting protocols. This, in turn, will necessitate changes in the ATM protocol stacks within the switches.

Based on this fact, an implementation where all the splitting functions can be encapsulated within the participating end stations is chosen. In such a case, splitting can be transparent to the network. Therefore protocols need not be enhanced for the switches to support splitting. The end stations that can enhance their protocols can implement splitting in order to improve the blocking performance of their connections.

IVC.1 User Plane Support

Figure 8:
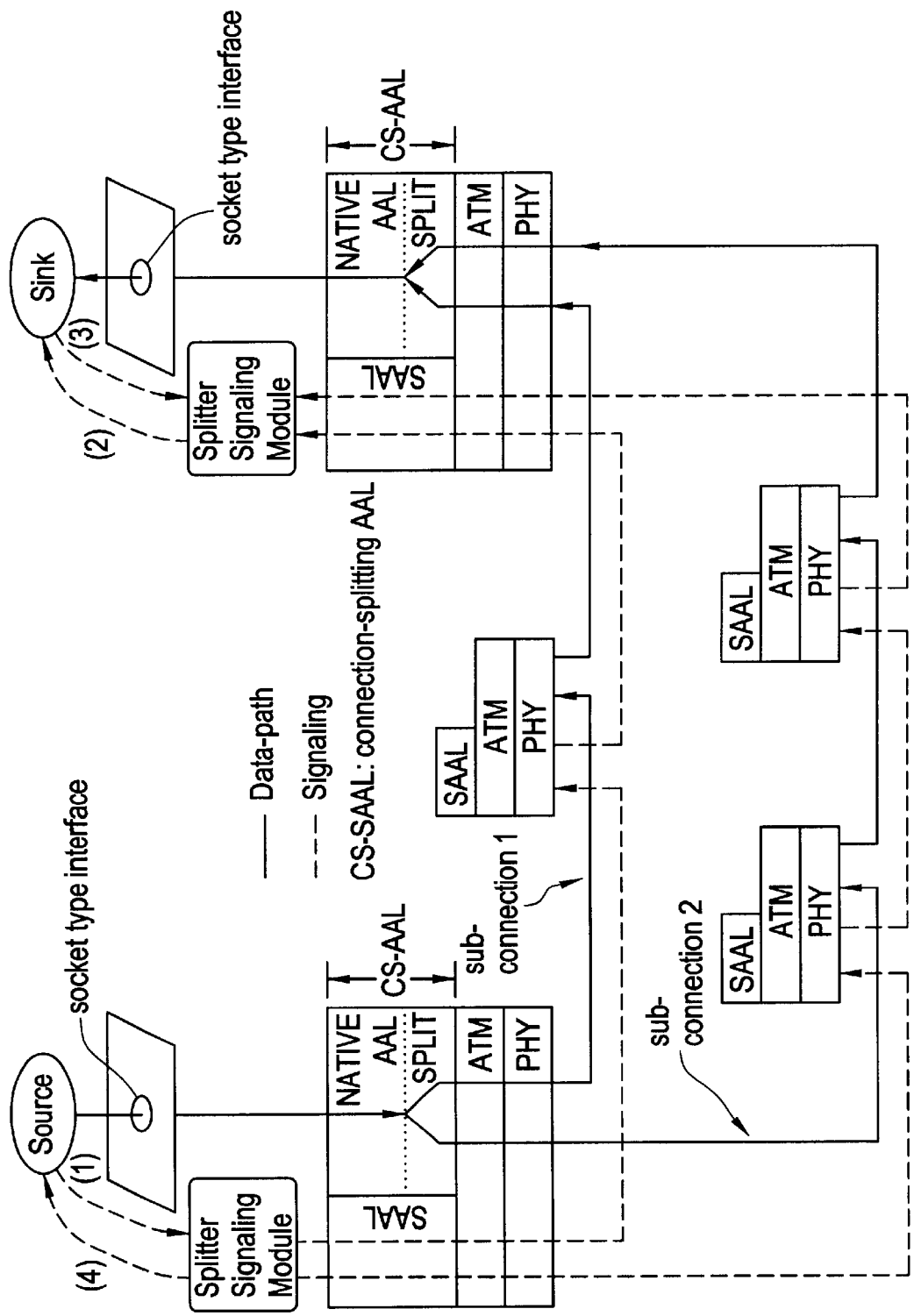
FIG. 8 shows a preferred embodiment of a system according to the present invention showing control and data-path implementation of connection splitting.

Within the end-stations, the user plane protocol enhancements according to the present invention are shown in FIG. 8. In this preferred embodiment the data splitting takes place at a layer which is in between the native AAL layer. See U. Black, "ATM: Foundations for Broadband Networks", Prentice Hall PTR, Englewood Cliffs, N.J., 1995, pp. 137–180 and the ATM layer. The source and the sink schedulers are placed in this new layer, termed as SPLIT sub-layer. After the sub-connections are setup, the SPLIT layer is informed about the parameters related to-scheduling, like number of sub-connections, the negotiated value of $N_{rm}$ and the UPC and QoS parameters specific to the sub-connection. The native AAL and ATM layers remains completely unchanged.

IVC.2 Control Plane Support

Control signaling for splitting according to the preferred embodiment is shown by the dashed lines in FIG. 8. The functions for splitting are lumped into a splitter signaling module which is executed on top of the signaling stacks at both the end-stations. Once a connection request (message 1) is issued to the control plane software, the request is first trapped by the splitter signaling module. The scheduler decides if the connection is to be split based on a predetermined policy.

Once it is decided that the connection is to be split, the splitter signaling module determines the number of sub-connections, flow distributions, $N_{rm}$ and other UPC and QoS related parameters. Then, it uses the standard control plane protocols for setting up all the sub-connections individually. Finally, when all the sub-connections are setup the splitter signaling modules passes the necessary scheduling parameters to the respective SPLIT layers and sends a message (4 in the FIG. 8) to the source application for initiating data delivery. At this point the SPLIT layers are ready to start cell scheduling and forwarding through the sub-connections.

Note that a connection setup message should contain a flag indicating the type of the connection (split or normal). If the connection is of split type then information regarding number of sub-connections, flow distributions, the value of $N_{rm}$ and other UPC and QoS related parameters should also be sent from the source to the sink entity.

One way of sending these pieces of information is to use few additional information elements (IE) fields in the connect signaling message. Though such an approach is straightforward, this solution requires some enhancements to the standardized Q.2931 signaling syntaxes. "ATM User Network Interface (UNI) Specification Version 4.0, AF-UNJ-4.0", ATM Forum, (July 1996).

A preferred and more general solution would be to use an open and distributed signaling framework. See V. D. Merwe and I. M. Leslie, "Switchlets and Dynamic Virtual ATM", Available from: http://www.cl.cam.ac.uk/Research/SRG/dcan/papers/im97_switchlets.ps.gz. Therein additional information can be sent easily using a higher layer message passing mechanism like ORB in the CORBA platform. See S. Vinoski, "CORBA: Integrating Diverse Applications within Distributed Heterogeneous Environments", IEEE Communications Magazine, February 1997.

IVD. Preferred Embodiment using PNNI

Figure 11:
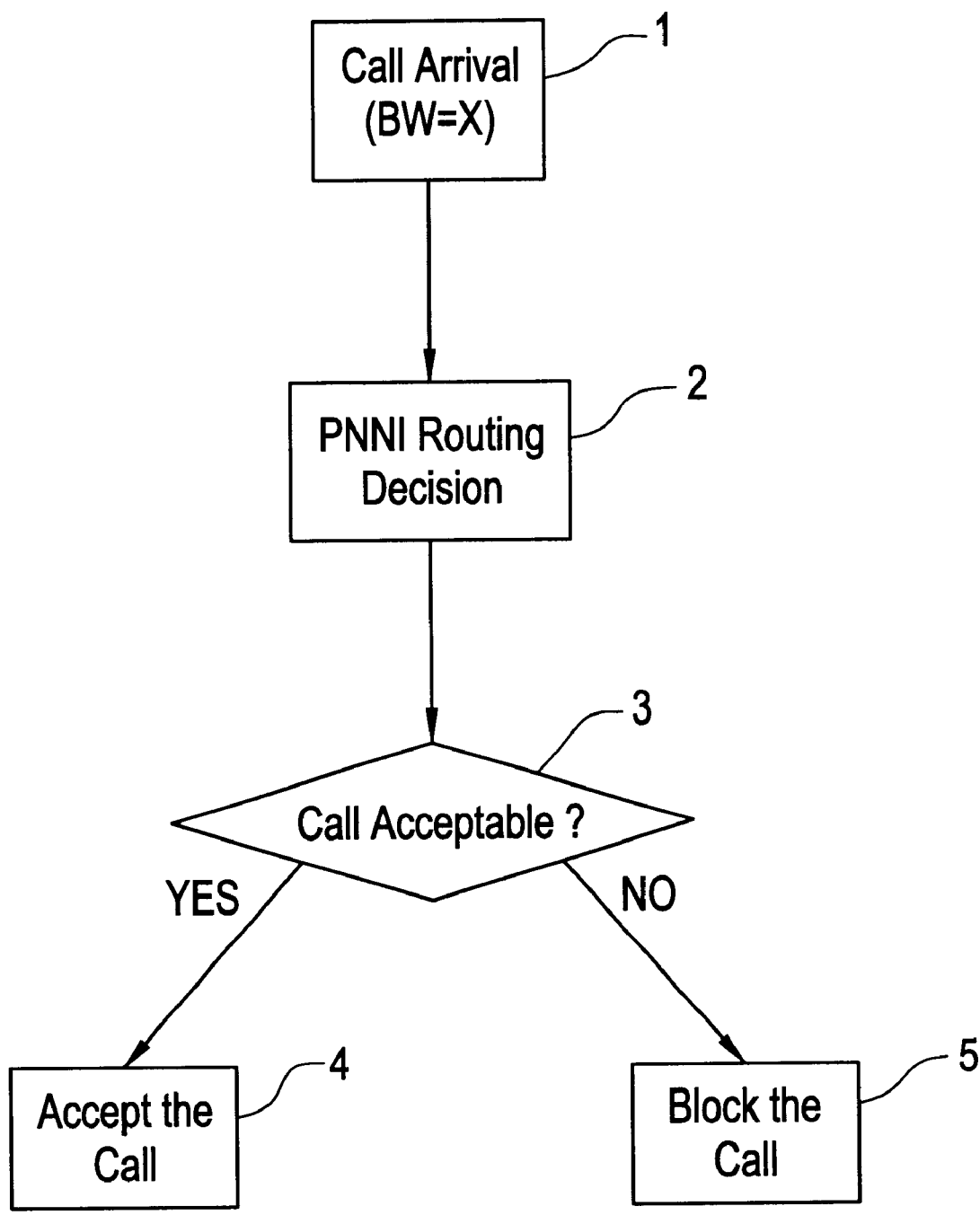
FIG. 11 depicts an algorithm showing a general framework for routing.

This section describes a preferred embodiment of the splitting algorithm is within the context of PNNI routing. See Private Network-Network Interface Specification Version 1.0 (PNNI 1.0). March 1996. The flow chart on FIG. 11 demonstrates the general structure of any PNNI routing algorithm. Step 1 corresponds to the arrival of a call with bandwidth requirement X. Besides bandwidth requirements, the call can have other QoS parameters, which are to be considered in the routing decision. The routing decision is made in step 2, where the call's QoS requirements are matched against those that network can provide. For example, the routing decision may be used on the routing algorithm proposed in A. Iwata, R. Izmailov, D.-S. Lee, G. Ramamurthy, B. Sengupta, H. Suzuki, "ATM Routing Algorithms with Multiple QOS Requirements for Multimedia Internetworking", E79-B IEICE Transactions on Communications 8, pp. 999–1007. (August 1996) and R. Izmailov, A. Iwata, D.-S. Lee, G. Ramamurthy, B. Sengupta, H. Suzuki, "Routing Algorithms for ATM Networks with Multiple Quality of Service Requirements", *Proceedings of the First Workshop on ATM Traffic Management*, Dec. 6–8, 1995, Paris, France, pp. 349–356. The result of the routing decision is evaluated in step 3. If the decision is positive (the call can be accepted), then, in step 4, the call is informed about the positive decision and the connection is established. Otherwise, in step 5, the call is informed about the negative decision and the connection is blocked.

According to this invention connection splitting can be done before the state of PNNI routing (herein called pre-routing splitting), or after the state of PNNI routing (herein calledt post-routing splitting). A detailed description of an algorithmic implementation for both splitting-based routing approaches follows. The description follows the flow charts in FIG. 12 (corresponding to pre-routing splitting) and FIG. 13 (corresponding to post-routing splitting).

Figure 12:
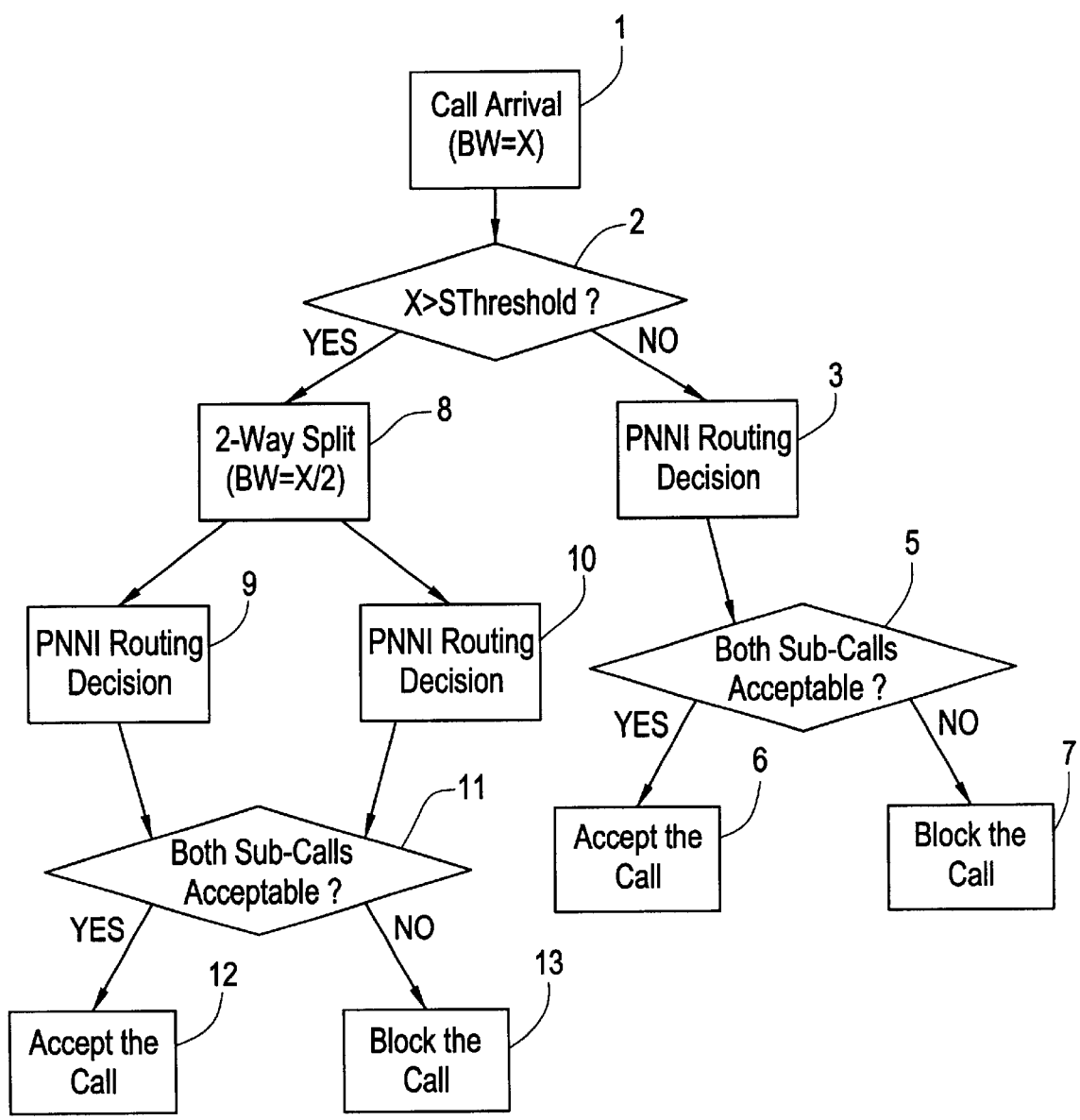
FIG. 12 depicts an algorithm showing pre-routing splitting.

Pre-routing splitting works in the following manner. Step 1 corresponds to the arrival of a call with bandwidth requirement X. Besides bandwidth requirements, the call can have other QoS parameters, that are to be considered in the routing decision. Step 2 compares the call's bandwidth X with splitting threshold, Sthreshold. If X exceeds Sthreshold, the next step is step 3, otherwise the next step is step 8. In step 3, the routing decision is made, and its result is evaluated in step 5. If the decision is positive (the call can be accepted), then, in step 6, the call is informed about the positive decision and the connection is established. Otherwise, in step 7, the call is informed about the negative decision and the connection is blocked. In step 8, the call is split in Nsplit sub-calls (FIG. 12 illustrates the case Nsplit= 2). Each of the sub-calls is routed individually (steps 9 and 10), and the results of their routing is evaluated in step 11. If both decisions are positive, then, in step 12, the call is informed on the positive decision and all the sub-calls are established. Otherwise, in step 13, the call is informed about the negative decision and the connection is blocked.

Figure 13:
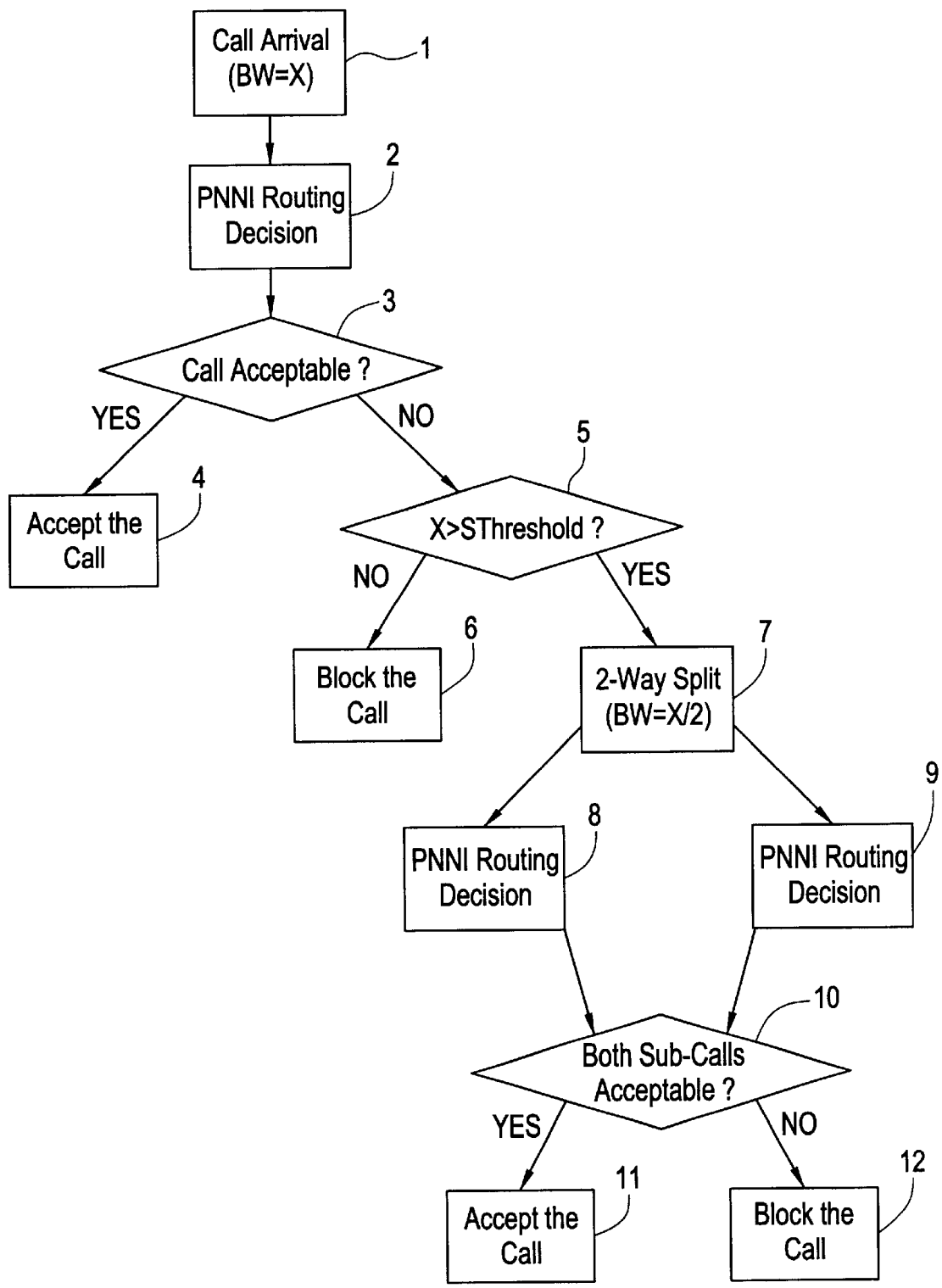
FIG. 13 depicts an algorithm showing post-routing splitting.

Post-routing splitting works in the following manner. Step 1 corresponds to the arrival of a call with bandwidth requirement X. Besides bandwidth requirements, the call can have other QoS parameters, which are to be considered in the routing decision. The PNNI routing decision is made in step 2, where the call's QoS requirements are matched against those that the network can provide. The result of the routing decision is evaluated in step 3. If the decision is positive (the call can be accepted), then, in step 4, the call is informed about the positive decision and the connection is established. Otherwise, in step 5, the call's bandwidth X is compared with splitting threshold, Sthreshold. If X exceeds Sthreshold, the next step is step 7, the call is split in Nsplit sub-calls (FIG. 13 illustrates the case Nsplit=2). Each of the sub-calls is routed individually (steps 8 and 9), and the results of their routing is evaluated in step 10. If both decisions are positive, then, in step 11, the call is informed about the positive decision and all the sub-calls are established. Otherwise, in step 12, the call is informed about the negative decision and the connection is blocked.

IVD. Routing Performance of Splitting

In this section, a simulation experiment for evaluating the call-level routing performance of splitting is described. Such an experiment is useful in determining the optimal number of subconnections.

IVD.1 Routing Protocols

A PNNI "Private Network-Network Interface Specification version 2.0, btd-pnni-02.00", ATM Forum, September 1997 compliant protocol, proposed in A. Iwata, R. Izmailov, D.-S. Lee, G. Ramamurthy, B. Sengupta, H. Suzuki, "ATM Routing Algorithms with Multiple QOS Requirements for Multimedia Internetworking", IEICE Transactions on Communications, Vol. E79-B, No. 8, August 1996, pp. 999–1007, is used as the baseline routing policy.

The algorithm uses a precalculated and an on-demand routing module. Routing modules are invoked sequentially during a call setup. A set of precalculated paths is computed off-line using the additive values of the administrative weights assigned to the network links by the network administrator. See A. Iwata, R. Izmailov, D.-S. Lee, G. Ramamurthy, B. Sengupta, H. Suzuki, "ATM Routing Algorithms with Multiple QOS Requirements for Multimedia Internetworking", IEICE Transactions on Communications, Vol. E79-B, No. 8, August 1996, pp. 999–1007; and "Private Network-Network Interface Specification version 2.0, btd-pnni-02.00", ATM Forum, September 1997.

When a call arrives, the routing algorithm first tries to route it on one of the precalculated paths. If none of the precalculated paths satisfy the call's QoS requirements, then an on-demand path calculation is invoked. In this phase, the protocol attempts to find the shortest path in the network which can support the required UPC and QoS parameters of the call in question. While computing the shortest path, for all network links, the quantity 1/AvCR is used as their corresponding weight factors.

The most recently advertised value of available cell rate for a link is represented by its AVCR. Further details of this algorithm and its performance are described in A. Iwata, R. Izmailov, D.-S. Lee, G. Ramamurthy, B. Sengupta, H. Suzuki, "ATM Routing Algorithms with Multiple QOS Requirements for Multimedia Internetworking", *IEICE Transactions on Communications*, Vol. E79-B, No. 8, August 1996, pp. 999–1007 and R. Izmailov, A. Iwata, B. Sengupta and H. Suzuki, "PNNI Routing Algorithms for Multimedia ATM Internet,"38 *NEC Research & Development* 1, pp. 60–73, 1997.

There are two possible ways to incorporate connection splitting into this baseline routing framework. In the first approach, splitting is performed only if the regular routing attempt fails because of capacity unavailability in the network. Here the goal is to utilize any fragmented network bandwidth for the otherwise blocked calls. Obviously, larger the call bandwidth, more beneficial is the splitting.

The second, and more efficient approach would be to perform a cooperative splitting where large bandwidth calls are split even if they can be supported using the regular routing. Such cooperative splitting is done to reduce bandwidth fragmentation. Such reduction is achieved by splitting wide-band connections into multiple low-band sub-connections. An example of this cooperative approach was explained in Section IVA. In both situations described above, once a connection is to be split all its sub-connections are routed using the described baseline protocol. Experimental results of only the first approach is provided.

IVD.2 Simulation Model

Figure 9:
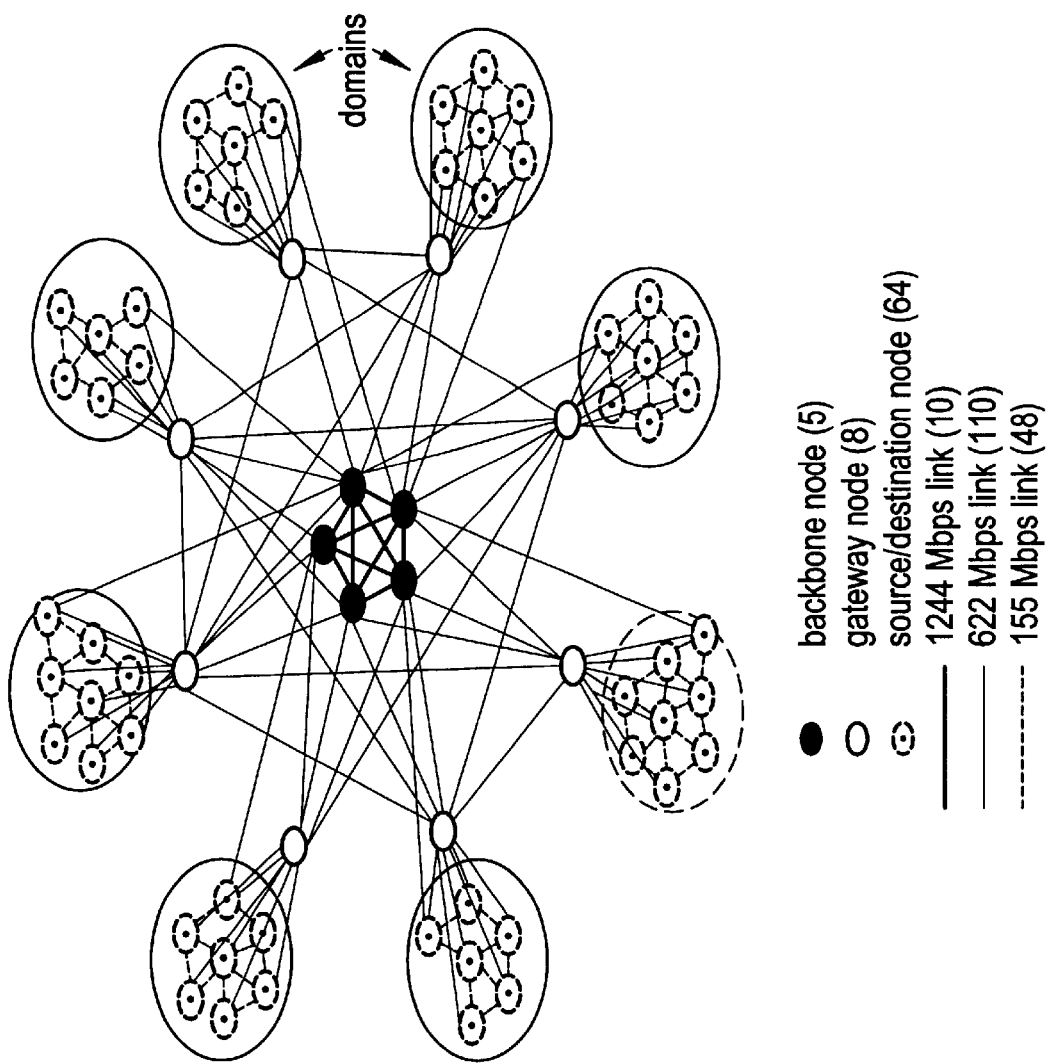
FIG. 9 shows the experimental enterprise network.

All the simulation experiments are carried out on an in-campus enterprise network whose topology and link capacities are shown in FIG. 9. Note that only the in-domain nodes act as traffic sources and destinations; all others are ATM switches. This network represents a lowest-level peer group in PNNI routing hierarchy.

A PNNI specified link state update (LSU) procedure is used by each node to advertize its links' states to the rest of the network. This state information includes the current administrative weight, CTD, CDV, CLR and the available cell rate AvCR. Since only a single peer group is simulated, each node in the network processes and updates their databases based on the LSU packet from all the nodes within the entire network.

Both the call holding time and bandwidth requirements of each call are simulated as exponentially distributed random variables. Similarly, call interarrival times are also modeled as exponentially distributed random variables. Network load variation is controlled by choosing appropriate values for the average interarrival time.

IVD.2.1 Results

Figure 10:
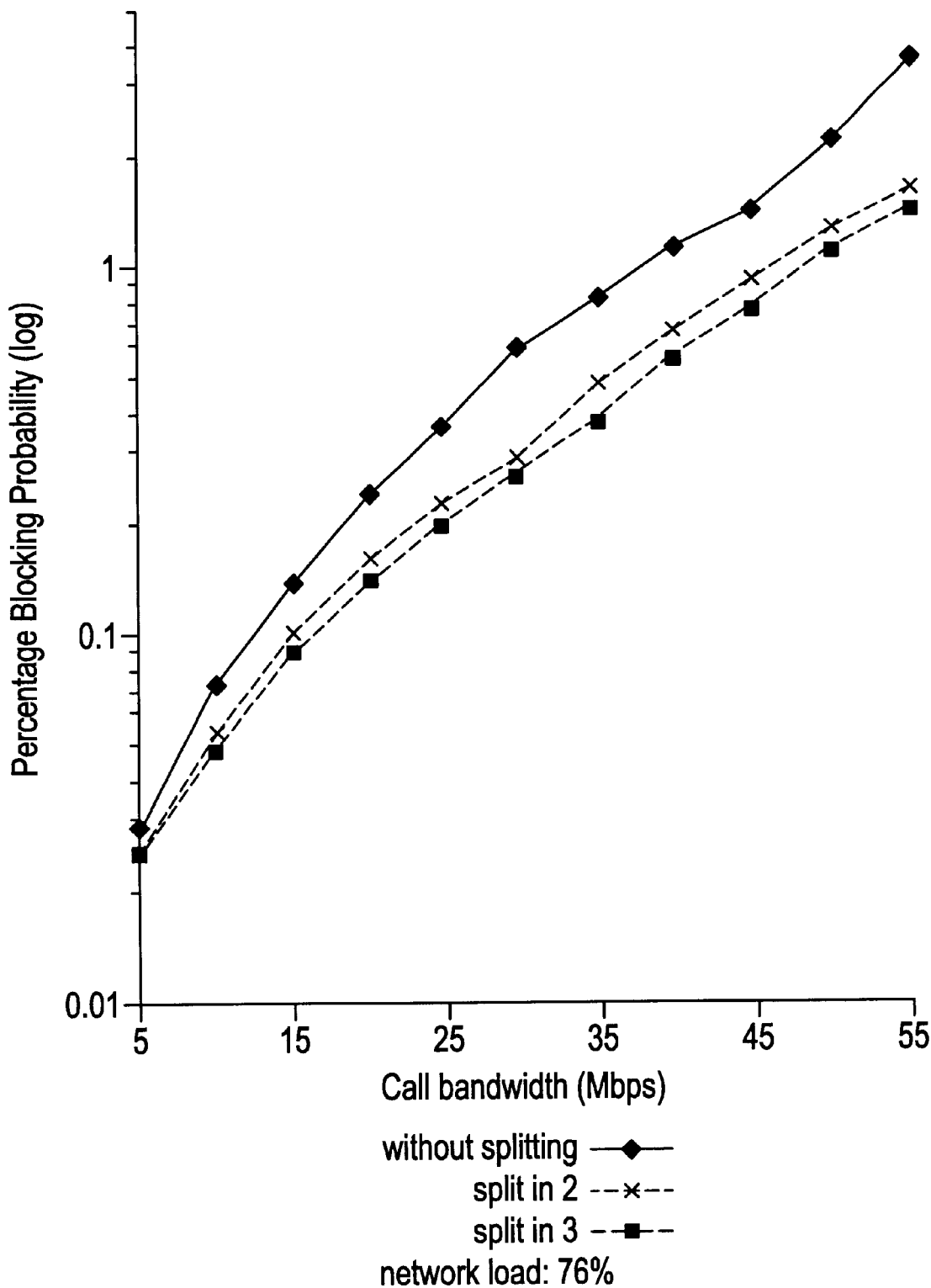
FIG. 10 shows call blocking distributions with and without connection splitting.

Blocking probabilities for calls with different bandwidth groups (of size 5 Mbps) are shown in FIG. 10. The blocking performance for connections up to a bandwidth requirement of 55 Mbps is captured. A call is first tried to be setup using the regular routing. If it is blocked the call is split into a certain number of sub-connections. If any of the sub-connections is blocked while routing, then the call is considered to be blocked.

As expected, with increasing capacity requirements the calls are more likely to be blocked both with and without splitting scenarios. With increasing call bandwidth, the absolute blocking reduction due to splitting also goes up. This is due to the fact that wideband calls are more affected by bandwidth fragmentation which is caused by the connection oriented routing of ATM. Another point to observe is that although the absolute blocking reduction goes up with call bandwidth, the percentage reduction remains more or less same over the entire range.

In the case of splitting with two sub-connections, the reduction of blocking remains in the vicinity of 45% with an exception when the call bandwidth is too high (more that 55 Mbps). Note that the blocking reduction is larger for three splits as compared two splits. However, the relative improvement of three subconnections over two is quite modest when compared to the improvement provided by two subconnections over the standard routing without splitting. Based on this and other results obtained from experiments with larger number of sub-connections, it can be concluded that splitting a connection into more than three sub-connections is not cost effective.

Similar experiments with higher network load is also conducted in order to measure the corresponding blocking reduction. Such experiments reveal that the splitting benefit starts to disappear when the network becomes too heavily loaded. Investigation revealed the following reasons. When the network starts getting heavily loaded, more and more lowband calls are originated which use up any fragmented bandwidth. Since splitting relies on available fragmented bandwidth, it cannot reduce blocking for the wideband calls in such a case. Under the above mentioned loading scenario, a load threshold of 92% is the upper limit, beyond which splitting does not provide any further blocking reduction.

Based on these and the cell-level results in Section IVA.5 it can be concluded that the mechanism of connection splitting can effectively reduce blocking without considerably deteriorating the original cell flow. While interpreting the results one should consider that splitting does not incur any network expenses. It is in the interest of an end-user to implement the mechanism in order to reduce the blocking suffered by its connections. From an application's point of view, a 45% reduction of blocking is significant, especially for the high bandwidth calls.

IVE. Conclusion

A technique for reducing ATM call blocking is provided. This technique splits a wideband connection into multiple low-bandwidth sub-connections. A detailed cell-level design for split scheduling algorithms is also provided. The analysis and simulation for the scheduling algorithm shows that while delivering reliable cell ordering, the split scheduling algorithms limits the cell loss rate within the same order of magnitude as the original line cell loss rate. A solution for implementing splitting without requiring any protocol changes within the network is also provided. Routing level simulations demonstrate that splitting can reduce blocking by up to 45% for high bandwidth calls in a moderately loaded network. Considering that this technique does not incur any network expenses and protocol changes, splitting is an efficient means for reducing connection blocking.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method of scheduling a source in an ATM network to reduce call blocking, said method comprising:
   a) selecting a degree of splitting;
   b) selecting a flow distribution;
   c) selecting UPC specifications;
   d) selecting a value of periodicity $N_{rm}$ of ATM RM cells;
   e) selecting a new sub-connection and setting an ATM RM sequence counter to zero;
   f) sending an ATM RM cell and increasing said ATM RM sequence counter by one;
   g) sending $N_{rm}$ number of ATM data cells through selected sub-connection of step e;
   h) checking flow distribution specification;
   i) determining if sub-connection is to be switched;
   j) repeating steps f–i if sub-connection is not to be switched in step i; and
   k) repeating steps e–j if sub-connection is to be switched in step i.

2. A method of scheduling a sink in an ATM network to reduce call blocking, said method comprising:
   a) selecting a degree of splitting;
   b) selecting a flow distribution;
   c) selecting UPC specifications;
   d) selecting a value of periodicity $N_{rm}$ of ATM RM cells;
   e) queuing ATM data cells for each sub-connection in a corresponding sink buffer;
   f) setting value of Expected RM (ERM) to zero;
   g) scanning all the sink buffers and selecting a buffer with smallest sequence numbered ATM RM cell in front of it;
   h) dropping all ATM data cells until next ATM RM cell if the ATM RM cell selected in step e is less than value of ERM;
   i) clocking out available ATM data cells in the sink buffer of step e if the ATM RM cell selected in step e is not less than the value of ERM;
   j) updating the value of ERM to one more than sequence number of the ATM RM cell selected in step g;
   k) delivering the available cells of step i; and
   l) repeating steps f–k for all the sink buffers.

3. The method of claim 2 wherein cells are clocked out in step i only if there are $N_{rm}$ or less number of cells within two surviving ATM RM cells in a sink buffer, otherwise the cells are dropped.

4. The method of claim 2, wherein said sink scheduling is initiated only after all sink buffers are filled with at least two ATM RM cells.

5. The method of claim 1, wherein $N_{rm}$ is chosen based on an application's burst tolerance.

6. The method of claim 1, wherein $N_{rm}$ is at least 32.

* * * * *